United States Patent [19]

Gluntz

[11] Patent Number: 4,812,286

[45] Date of Patent: Mar. 14, 1989

[54] SHROUD TANK AND FILL PIPE FOR A BOILING WATER NUCLEAR REACTOR

[75] Inventor: Douglas M. Gluntz, San Jose, Calif.

[73] Assignee: General Electric Company, San Jose, Calif.

[21] Appl. No.: 153,163

[22] Filed: Feb. 8, 1988

[51] Int. Cl.[4] .................. G21C 9/00; G21C 15/00
[52] U.S. Cl. ................................. 376/282; 376/299
[58] Field of Search ..................... 376/282, 298, 299

[56] References Cited

U.S. PATENT DOCUMENTS

| | | |
|---|---|---|
| 3,245,881 | 4/1966 | Ammon et al. |
| 3,357,891 | 12/1967 | Wadmark |
| 3,392,087 | 7/1968 | Braun et al. |
| 3,401,082 | 9/1968 | Ammon et al. |
| 3,929,567 | 12/1975 | Schabert et al. |
| 4,057,467 | 11/1977 | Kostrezewa |
| 4,702,879 | 10/1987 | Tower et al. |
| 4,755,348 | 7/1988 | Shiralkar et al. |
| 4,759,899 | 7/1988 | Koutz et al. |

Primary Examiner—Deborah L. Kyle
Assistant Examiner—Richard W. Wendtland
Attorney, Agent, or Firm—Robert R. Schroeder

[57] ABSTRACT

A shroud tank and fill pipe for a boiling water nuclear reactor of the type having a reactor vessel containing a saturated water coolant inventory, a reactor core for heating water to generate a steam/water mixture, a steam separator for classifying said steam and water from the steam/water mixture, and standpipes for conveying the steam/water mixture from the core to the steam separator. The shroud tank is disposed inside the reactor vessel overlying the reactor core and circumscribing the standpipes. The shroud tank has an open top, a closed bottom, and a plurality of drain holes around its bottom periphery. During normal reactor operation, the shroud tank is supplied with cold water coolant which is continuously introduced at relatively low flow rates into the shroud tank through the fill pipe. The drain holes are sized to minimize the outflow of cold water coolant during normal operation. During a loss of coolant accident, the drain holes release cold coolant to cool the reactor core when the "hot" coolant level drops below the drain holes. Because of the substitution of cold coolant, the amount of reactor coolant lost because of flashing during depressurization is reduced. The reduction of lost coolant permits relaxation of the volume, height, containment, and primary emergency core cooling requirements for the reactor.

20 Claims, 3 Drawing Sheets

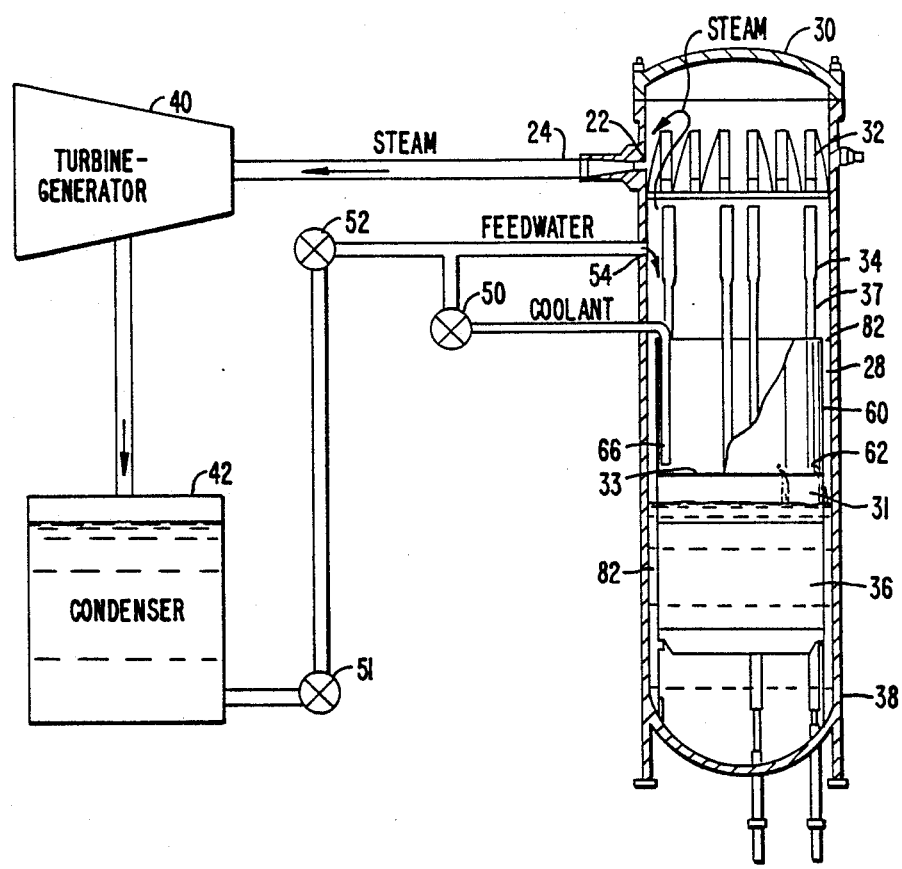
FIG._1.

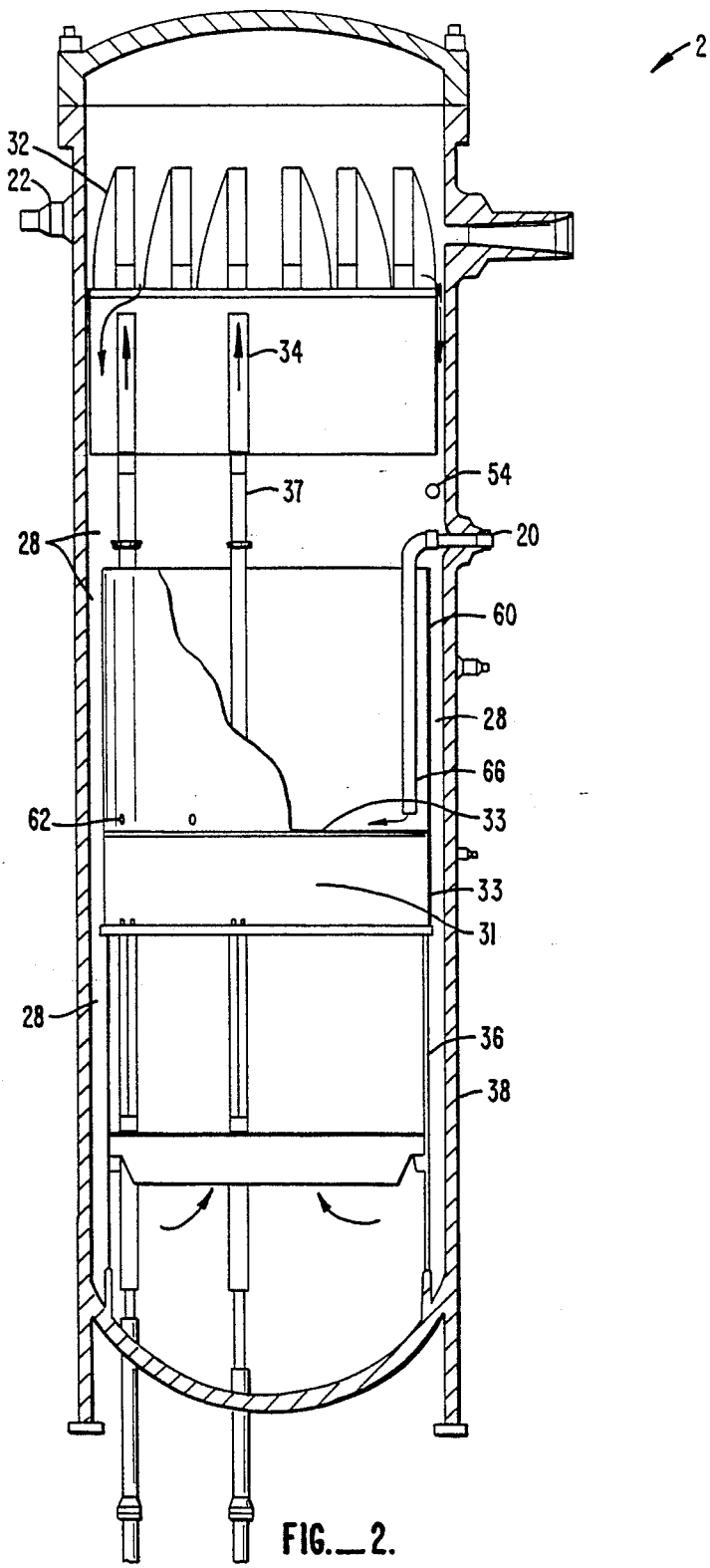
FIG._2.

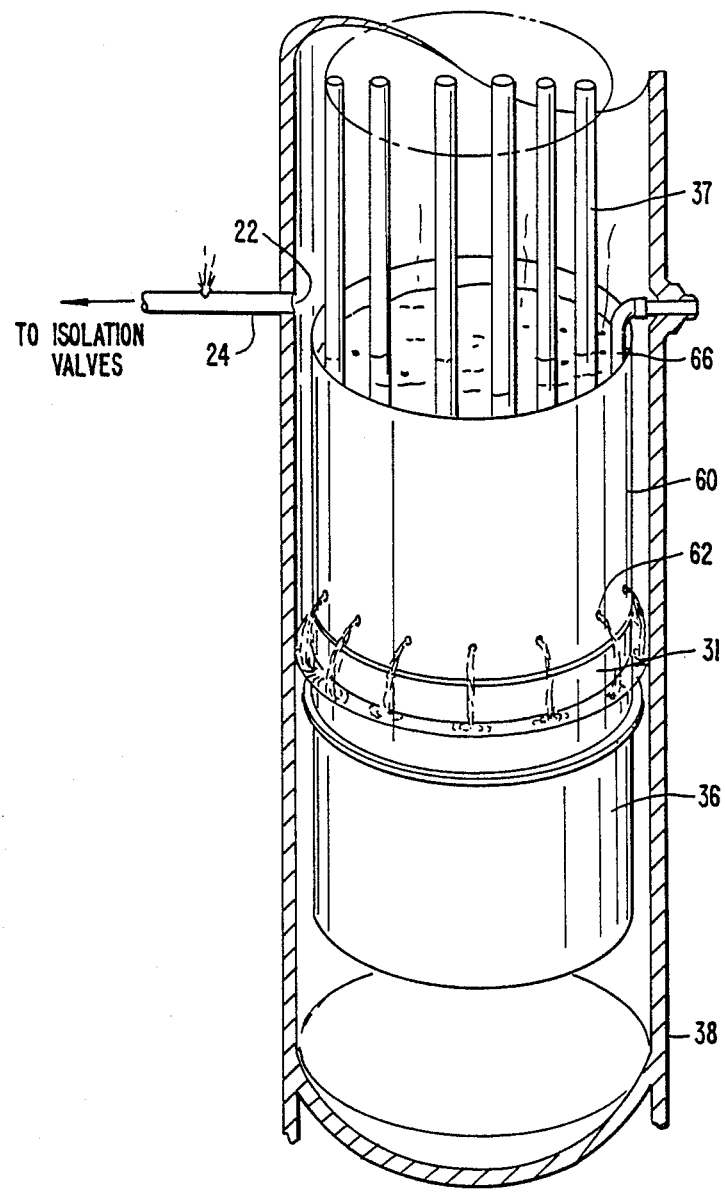
FIG.__3.

SHROUD TANK AND FILL PIPE FOR A BOILING WATER NUCLEAR REACTOR

The invention relates generally to emergency core cooling systems for boiling water nuclear reactors. More particularly, the invention relates to a shroud tank which is disposed at an upper elevation within a nuclear reactor vessel and is supplied with cold coolant. This cold coolant within the shroud tank sustains minimal flashing of liquid into steam during the depressurization that accompanies a loss-of-coolant accident, and by virtue of other features of the shroud tank, this coolant is inherently released to drain into the bottom of the reactor to supplement residual coolant in covering the reactor core.

BACKGROUND OF THE INVENTION

Nuclear power reactors are used in nuclear power stations supplying electrical power to a power transmission grid. The fuel assemblies that comprise the core of such reactors must be provided with coolant to remove thermal energy produced during the processes of nuclear fission and radioactive decay of fission by-products. Both such processes are on-going during power production operations. Direct-fission-produced thermal energy production is the principal heat generation process during reactor power generation operations. The radioactive decay process is on-going at not-insignificant thermal energy production rates even weeks or months following cessation of power generation operations.

Cooling of the fuel assemblies is accomplished during power production operations by circulating large total flow rates of reactor coolant through the fuel assemblies. Cooling is accomplished during reactor shutdown operation modes by maintaining the core well covered with liquid coolant that is undergoing heat removal via circulation at comparatively low total flow rates through the heat exchangers of a residual heat removal system.

For normal power generation operations, the thermodynamic efficiency of the power generation cycle of the nuclear power station is improved by operating the reactor (and consequently its coolant) at very high pressures and temperatures. For boiling water reactors (BWRs) used in such nuclear power stations, the reactor vessel housing the nuclear core contains coolant in the forms of slightly subcooled water, saturated water, steam-and-water mixture, and saturated steam—all at temperatures and pressures at or close to 546° F. and 1020 psia, respectively.

Various postulated events may cause the reactor to experience a partial loss of its coolant inventory. A subcategory of such loss-of-coolant inventory events includes loss-of-coolant accident (LOCA) events, in which an hypothesized pipe break results in the reactor coolant inventory to be expelled from the reactor due to the initial high pressure and temperature of the coolant. Isolation valves are installed on lines connecting to the reactor to prevent or at least mitigate the extent of coolant inventory loss. However, in certain other hypothetical situations, such as for pipe breaks occurring between the reactor and the pipeline innermost isolation valves, the action of isolation valve closures could not prevent the reactor from undergoing a full blowdown. Additionally, event scenarios may include an intentional reactor full controlled depressurization because of the hypothesized nonfunctioning of high-pressure coolant injection systems and the consequent need to depressurize promptly so that low-pressure coolant injection systems can accomplish needed coolant resupply. To prevent serious core damage given such casualty scenarios, it is necessary to design the reactor to have enough initial coolant inventory to keep the nuclear core at all times covered with coolant. This prevents the fuel rods of the nuclear fuel assemblies from heating beyond acceptable levels.

Several emergency core cooling schemes have evolved to insure that the reactor core is properly cooled during a LOCA. The complement of safety grade systems that are provided as part of the nuclear steam supply system to meet these needs for adequate assured core cooling, are known as the emergency core cooling system (ECCS). For example, one BWR product line produced by GE Nuclear Energy uses both high-pressure as well as low-pressure injection of water as major elements comprising its ECCS. Considerable energy must be expended during the casualty to effect the required high-pressure injection of coolant. ECCS systems providing these high pressures must be brought on line while the casualty is occurring. In addition, these systems depend on the long term operation of power supplies such as emergency diesel generators and connected electrical pumps and are therefore expensive when designed to the required margins of reliability.

Advanced designs such as the simplified boiling water reactor (SBWR) seek to avoid reliance on pumping systems during a LOCA. These systems employ in new ways the large pool of water known as a "suppression pool" which is connected by pipes to the reactor. The suppression pool in the SBWR design is located within the reactor containment at an elevation higher than the core. The water in the suppression pool can now be used to flood the reactor core by gravity action alone after the reactor has depressurized following a LOCA.

The SBWR ECCS now consists of the aforesaid suppression pool, plus the aforesaid injection lines which connect the suppression pool to the reactor, plus a depressurization subsystem. Several limitations arise in connection with this conventional SBWR ECCS. First, the depressurization subsystem is required to reduce reactor pressure very rapidly. In addition, an adequate initial inventory of reactor coolant must be contained within the reactor vessel to counterbalance the coolant inventory lost because of flashing during depressurization. The initial water inventory must be such that the residual water inventory after flashing will keep the core covered by coolant until additional water is gravity injected by the suppression pool. As a result, the SBWR is required to have more initial water inventory than is needed by a conventional BWR. Approximately 15 to 20 feet of extra reactor vessel height is required to meet the needs for emergency core cooling for the SBWR.

For SBWR, this 15- to 20-foot region is also used as a chimney that promotes coolant circulation through the fuel assemblies. The two-phase steam/water mixture generated by heating water in the reactor core naturally up-flows through this region from the reactor core through standpipes to a steam/water separator assembly. Saturated liquid separated from the two-phase mixture by the steam separator assembly is discharged back into the reactor region external to the chimney. The discharged saturated water then flows at low velocities back into the reactor downcomer where it undergoes mixing with the cooler feedwater being returned to the reactor. The now-mixed coolant is at reactor pressure and is 20° to 30° subcooled, and so is still extremely hot. Because of its high temperature, a substanial fraction of this "hot" coolant will flash into steam during reactor depressurization following a LOCA.

For reactor coolant initially at 546° F. and 1020 psia, depressurization of the reactor to 212° F. and atmospheric pressure following a LOCA will result in approximately one-third of the water mass being flashed as steam and two-thirds remaining as water. The additional reactor vessel height and volume required to compensate for this coolant inventory lost due to flashing during depressurization of the reactor leads to a substantial increase in the capital cost of the nuclear island portion of the power station.

SUMMARY OF THE INVENTION

The invention reduces the amount of reactor coolant lost due to flashing during depressurization following a LOCA.

According to the invention, a shroud tank is disposed inside the reactor overlying the reactor core and circumscribing the standpipes. The shroud tank has an open top, a closed bottom, and a plurality of drain holes around its bottom periphery. During normal operation, the reactor operates with an ambient water level that is above the top of the shroud tank. Water pressure inside the shroud tank and outside the shroud tank is substantially the same.

The shroud tank is continuously supplied at low flow rates during normal reactor operation with cold coolant introduced into the shroud tank through a fill pipe. The injection of cold water (subcooled feedwater) into the shroud tank continuously displaces the liquid coolant previously within. In its short duration residency within the shroud tank, coolant may have become somewhat warmed because of the presence of the steam separator standpipes that vertically transit the shroud tank and carry very hot reactor coolant. Thus, the continuous injection of cold coolant assures that the coolant within the shroud tank will be not significantly warmer than the temperature of the fresh coolant just arriving.

The shroud tank drain holes are modest both in number and in orifice flow area. Since the differential in water pressure between the inside of the shroud tank and the outside of the shroud tank is small, inconsequential volumetric flow occurs though the drain holes during normal operation, and the primary exhausting of the displaced shroud tank inventory occurs upwardly out the tank open top. Thus the inventory of subcooled feedwater in the shroud tank maintains itself as a constantly-purged cool volume of elevated coolant within the reactor.

A LOCA, however, causes more rapid release of the subcooled coolant inventory through the drain holes. Typically, the depressurization of the entire reactor coolant caused by the LOCA will in turn cause large fractions (i.e., one-third) of the water outside the shroud tank to flash to steam because this water is all at very high temperatures. Consequently, the LOCA causes the water level inside the reactor to fall. This water level will fall below the level of the open top of the shroud tank. Upon such falling in level below the top level of the shroud tank, a differential in pressure will be seen at the drain holes. This differential in pressure will include a high static pressure on the inside of the shroud tank and a correspondingly lower static pressure on the outside of the shroud tank. Responsive to this differential in pressure, significantly increased volumetric flow of the inventory of subcooled feedwater will occur from the inside of the shroud tank to the outside of the shroud tank. Release of coolant to assist with maintaining the core covered will result.

The invention thus substitutes cold coolant inventory for the hot coolant inventory otherwise contained in the reactor at the occurrence of a LOCA. As a result, the amount of reactor coolant lost because of flashing during depressurization following a LOCA is reduced. The reduction of lost coolant permits a reduction in the volume and height requirements of the reactor vessel which permits a reduction in the reactor containment cost. The reduction of lost coolant also permits relaxation of the performance requirements for whatever primary emergency core cooling system is used. For example, the suppression pool elevation for a gravity driven emergency cooling system may be lowered, or its volume reduced in size. Alternatively, the reactor vessel depressurization system requirements may be lessened.

Further objects and features of the invention will become apparent by reference to the following brief description of the drawings, the detailed description of the drawings and the appended claims.

BRIEF DESCRIPTION OF THE DRAWINGS

FIG. 1 is a diagram of a nuclear power generating system, including a nuclear reactor and a return feedwater coolant system employing a shroud tank according to the invention:

FIG. 2 is a detailed cross-sectional view of a boiling water reactor having a shroud tank disposed therein according to the invention: and, FIG. 3 is a pictorial illustration of the shroud tank cold coolant outflow into the reactor vessel during depressurization following a LOCA.

DETAILED DESCRIPTION OF THE DRAWINGS

FIG. 1 shows a nuclear power generating system that includes a simplified boiling water reactor 30 according to one embodiment of the invention. Boiling water reactor 30 has a steam outlet to a turbinegenerator 40. Turbine-generator 40 generates electrical power and has an outlet for exhaust steam to a condenser 42. Condenser 42 condenses the exhaust steam to condensate and has a condensate outlet to the suction of condensate pump 51. Condensate pump 51 boosts the pressure of the condensate to the inlet pressure of feedwater pump 52. Feedwater pump 52 boosts the pressure of the condensate to a level exceeding the pressure interior of the reactor 30. The resultant discharged and pressurized condensate is now feedwater. This feedwater enters the interior of the reactor vessel through a sparger 54 inside nuclear reactor 30.

Reactor 30 includes a reactor vessel 38 which houses a reactor core 36, a steam separator 34, and a steam dryer 32. Reactor core 36 heats water to generate a two-phase steam/water mixture. The two-phase mixture exits the reactor core from a core shroud head 33 immediately overlying core 36. The two-phase steam/water mixture is conducted through standpipes 37 mounted on the top of the core shroud head 33 to steam separator 34. Wet separated steam flows through steam dryer 32 to turbine-generator 40. Separated saturated water is discharged internally within the reactor vessel and flows into the reactor downcomer region 28. The discharged saturated water coolant undergoes mixing with the cooler feedwater being returned to the reactor at sparger 54.

The circulation of water within the reactor is easily understood. Water flows upwardly and centrally from the bottom of the reactor vessel 30 to and toward the top of the reactor vessel 30. In this upward passage, water is heated at the reactor core 36. The heated and two-phase coolant then passes to a core upper plenum 31 enclosed by core shroud head 33.

The two-phase steam/water mixture then passes upwardly through steam standpipes 37. At the top of the standpipes 37, the steam/water mixture encounters the steam separators 34. Water is rejected from the mixture at the steam separators (while the steam is channeled upwardly to thence flow through the dryers 32 and out the steam outlet 22).

The rejected water flows over the top of the shroud tank 60. This rejected water then flows in the interstitial volume between the shroud tank 60 and the sidewall of the reactor vessel 30 at downcomer region 28. Once the water has traversed the downcomer region 28, the water returns to the bottom of the reactor vessel and the circulation of the coolant interior of the reactor is endlessly repeated.

As previously mentioned, the hot two-phase mixture is conducted from the core upper plenum 31 to the steam separator 34 by a plurality of standpipes 37. The reactor vessel 38 includes a volume of water 82 at 546° F. and 1020 psia in the region surrounding the steam separator standpipes. This coolant inventory region typically extends at least 20 feet above the reactor core shroud head 33 in a natural circulation boiling water reactor.

When a LOCA occurs, various system instrumentation will signal a reactor SCRAM. Control rods (not shown) will be inserted into core 36. Normal casualty control procedures will be automatically initiated including the rapid closure of main steam isolation valves (not shown) and other related casualty procedures. As previously mentioned, if the LOCA occurs inboard of the isolation valves, reactor coolant will be expelled from the reactor because of the high pressure and temperature of the coolant.

As reactor coolant is lost, depressurization systems will be activated causing the reactor to lose pressure. For a BWR such as a SBWR, a suppression pool (not shown) will be employed for exhaust and condensation of the steam flashing from the reactor.

Referring still to FIG. 1, there is shown disposed in reactor vessel 38 a shroud tank 60 according to the invention. Shroud tank 60 circumscribes standpipes 37 and is disposed between separator assembly 34 at the upper end and the shroud head 33 at the lower end. Shroud tank 60 has an open top and closed bottom and a plurality of drain holes 62 at the bottom. The drain holes 62 are preferably disposed around the periphery of shroud tank wall near the tank bottom.

The standpipes 37 extend completely through the shroud tank bottom and out and above the open top. These standpipes communicate steam/water mixture through the shroud tank without allowing mixing with the fluid in the shroud tank.

Shroud tank 60 has an inlet fill pipe 66. Inlet fill pipe 66 receives cold coolant from feedwater pump 52.

The temperature of feedwater supplied to reactor 30 is typically less than 546° F. typically by a margin of at least 120° F. Moreover, feedwater heating is typically undertaken on the feedwater after its discharge from feedpump 52 and prior to its injection into reactor 30. Thus, the temperature of feedwater passing through feedpump 52 is typically 285° F. This provides a relatively cool supply of high pressure water for use as coolant filling shroud tank 60. Thus, shroud tank 60 contains a volume of cold coolant relative to the otherwise hot, saturated water that would be contained in the same region in a conventional boiling water reactor.

It will be remembered that reactor internal components are typically constructed of stainless steel. Stainless steel is a poor conductor of heat. Therefore, shroud tank 60 will maintain the liquid subcooled. Moreover, standpipes 37—also constructed of stainless steel—will not appreciably warm the super cooled feedwater interior of shroud tank 60. Alternatively insulation 61a (not shown) and 61b (not shown) can be used on both the shroud tank 60 and standpipes 37.

FIG. 2 is an enlarged detailed crosssectional diagram of a boiling water nuclear reactor 2 having a shroud tank disposed therein according to invention. As shown in FIG. 2. the reactor 2 includes a reactor core 36 and core upper plenum 31. A shroud head 33 receives the two-phase steam/water mixture at the core outlet and transports the mixture to a group of standpipes 37 whereupon the mixture ultimately flows to steam separators 34. Steam separators 34 discharge wet steam to steam dryers 32 which have an ultimate output to steam nozzle 22 which connects reactor 2 to turbine-generator 40 through main steam line 24. (See FIG. 1).

Feedwater is supplied to the reactor vessel 2 through sparger 54. Hot, saturated coolant is discharged by steam separator assembly into downcomer region 28. The discharged feedwater mixes with the hot coolant entering into downcomer 28 and by natural circulation re-enters reactor core 36. Reactor core 36 heats the coolant to a two-phase steam/water mixture and the standpipes 37 conduct the two-phase mixture to steam separators 34 endlessly repeating the cycle.

Referring still to FIG. 2, there is shown a shroud tank 60. Shroud tank 60 circumscribes standpipes 37 and has an open top beyond which the standpipes extend. The bottom of shroud tank 60 is substantially closed by shroud head 33. A plurality of drain orifices or holes 62 are disposed about the periphery of shroud tank 60 near its bottom. Preferably, the plurality of drain holes 62 are sized to enable fairly rapid draining of shroud tank 60 during a LOCA. As previously set forth, during such a casualty the water level in the reactor will drop below the level of the top rim of shroud tank 60. The drain holes 62 are located to permit the cold coolant water contained within the shroud tank to drain into the downcomer region radially and externally through the shroud tank wall.

It will be remembered that during depressurization responsive to a LOCA, the interior of the reactor vessel is undergoing a rapidly decreasing pressure gradient. This decreasing pressure condition will have no appreciable effect on the outflow of super cooled coolant from shroud tank 60 through drain holes 62. Instead, the force driving fluid through the drain holes 62 will be hydrostatic head differential between the inside of the shroud tank 60 and the outside of the shroud tank 60 at the elevation of drain holes 62.

Fill pipe 66 supplies cold coolant to the interior of shroud tank 60. Fill pipe 66 extends through the reactor pressure vessel 38. Fill pipe 66 is shown extending downward into the very bottom of shroud tank 60. The fill pipe 66 discharges cold coolant toward the bottom of shroud tank 60.

The operation of the invention will now be discussed. FIG. 2 will be used to describe normal operation. FIG. 3 will set forth operation during a LOCA.

During normal operation of the reactor, saturated "hot" coolant is discharged from the lower end of the steam separators located at the top of the standpipes. The saturated liquid moves in a radially outward direction over the open end of the shroud tank. The feedwater returning to the reactor through feedwater spargers mixes with the laterally moving saturated hot coolant discharged from the steam separators.

Meanwhile, cold water is injected into the shroud tank 60 at relatively low rates. The liquid coolant contents within shroud tank 60 are slowly displaced by subcooled coolant continuously arriving via fill pipe 66 into the bottom of the tank 60.

Displaced cold coolant exits very slowly from the open top of the shroud tank. Thus inventory of the shroud tank is constantly being replenished with cold coolant. The coolant inside the shroud tank is obviously cold relative to the mixed feedwater plus separator discharge liquid. Consequently, a slight hydrostatic head differential will arise between the feedwater plus hot coolant mixture and the cold water coolant in the shroud tank. This hydrostatic head difference will cause the cold water from the shroud tank to flow very slowly outwardly through the drain holes 62 of the shroud tank 60 into the downcomer region 28. Such flow will not appreciably deplete the inventory of subcooled water in the shroud tank 60.

During normal operation of the reactor, cold coolant is injected into the shroud tank at a rate representative of a small fraction of the total feedwater flow. However, cold coolant need not be injected during a LOCA according to the invention. As a consequence, the invention has the added advantage that the coolant injection system used to inject coolant into the shroud tank need not be a safety grade system.

Referring to FIG. 3 and during a LOCA, the reactor undergoes a rapid depressurization. As a result, the coolant level inside the reactor will drop because of flashing and boil-off of steam from the hot coolant inventory. Water from the downcomer region will flow into the core to take the place of water flashed to steam. Operating level of the reactor water will fall.

Eventually, the level of the hot coolant inventory will drop below the top of the shroud tank. At this time, a gravity generated pressure differential will arise between the inside of the shroud tank and the downcomer region 28. This pressure differential will include a greater hydrostatic pressure interior of the shroud tank 60 and a lesser hydrostatic pressure exterior of the shroud tank 60. This enhanced pressure differential will cause cold coolant to flow through the drain holes 62 in the bottom periphery of the shroud tank 60 and into the reactor vessel downcomer region 28 to cover the reactor core.

The reader will understand that the flow of subcooled coolant through drain holes 62 will at first be a low flow responsive to a low hydrostatic differential pressure. As the level external to the shroud tank decreases, the driving hydrostatic pressure differential increase and the resultant flow will increase in response. Simply stated, responsive to the severity of the casualty, coolant will be supplied in increasing volumes.

It will be appreciated that the view of FIG. 3 is an extreme example. The level of the water in the reactor is illustrated to have fallen below the level of the shroud tank bottom. This enables the flow from the drain holes 62 to be more clearly illustrated. It is important to realize, however, that flow of coolant for covering of the core begins long before the level illustrated in FIG. 3 is reached.

Because the contents of shroud tank 60 are relatively cold, this fluid will not undergo flashing to the same extent as does the hot coolant inventory. As a result, several significant benefits are achieved. First, the amount of reactor coolant lost during depressurization is reduced. More residual coolant is therefore available to prevent core uncovery or to minimize the duration of core uncovery during a LOCA. Secondly, depressurization may occur more rapidly because the total quantities of flashed steam released are minimized. Further, since the amount of steam released from the reactor is reduced, the design requirements for the containment system to handle the steam and energy quantities involved in depressurization may also be reduced.

In an embodiment where the invention is used in conjunction with a gravity-driven cooling system, additional benefits are also realized. The provision of addition residual coolant minimizes the possibility of core uncovery before the gravity-driven cooling system water injections occur. Further, since the reactor pressure vessel may be depressurized more rapidly, the gravity-driven cooling system is able to begin refilling the reactor pressure vessel sooner with additional coolant. Alternatively, the elevation of the suppression pool relative to the core could be reduced, permitting a shorter containment height or a smaller suppression pool size. In addition, since the amount of steam released from the reactor is reduced because of the cooler water inventory, the burden on the suppression pool to handle recycled steam and energy quantities is also reduced.

Refer now to FIG. 3. FIG. 3 is a stylized pictorial illustration of the invention in operation during a LOCA. As shown in FIG. 3, the level of hot coolant inventory in the reactor pressure vessel has fallen below the level of the orifices or holes contained around the bottom of the shroud tank. As a result, cold water inventory outflows from the shroud tank into the downcomer region of the reactor pressure vessel.

The use of and the size of the holes as shown in FIGS. 2 and 3 is for illustration only and in an actual embodiment would be dictated by overall design considerations.

By placing the shroud tank inside the reactor vessel for operation during a LOCA, the invention avoids, or at least minimizes, the cost of constructing and operating an independent external source of emergency coolant outside the reactor vessel. It can also be seen that the invention is "passive", i.e., operates without activating any switches, pumps, or power supplies following a LOCA.

In an alternative embodiment, a plurality of fill pipes may be provided to inject coolant into the shroud tank during normal operation.

In another embodiment, heat transfer barriers may be provided to prevent heat transfer from the standpipes to the contents of the shroud tank. These heat transfer barriers may be in the form of insulation applied to the standpipes, either internally or externally. Similarly, barriers to heat transfer may be applied to the core shroud head. As another alternative, the shroud tank itself may be insulated. As another alternative for minimizing undesirable heat transfer, the shroud tank, the standpipes, and the core shroud head or other portions of the reactor pressure vessel may be composed of materials having a relatively poor thermal conductivity.

In another embodiment, a plurality of shroud tanks may be utilized. The shroud tanks may be coaxially configured about the reactor's vertical axis. In this embodiment, the tank height is highest for the innermost shroud tank and is progressively lower for each tank disposed radially outward. The purpose for this configuration, among other things, is to facilitate the lateral outflow of liquid discharged from the steam separators assembly. This particular embodiment would permit conventional water level "crowning" problems to be kept within acceptable limits. For such a configuration, the size, location and number of drain holes might be substantially different amongst the various shroud tanks depending on design requirements.

Although the use of moving parts in the invention is not generally desirable, in another embodiment, a valving system may be substituted for or added to the holes for permitting outflow of cold water coolant during a LOCA. The valves prevent the outflow of cold water coolant from the shroud tank until the pressure in the reactor vessel falls below a predetermined pressure. This predetermined pressure could be, for example, the pressure differential present when the reactor coolant level falls below the holes near the bottom of the shroud tank.

Further, although the shroud tank may be filled by a dedicated coolant pump and/or source of condensate external to the reactor vessel, the existing feedwater inlet may be used given the low rate of coolant injection required for the shroud tank.

Although the invention has been described with reference to the foregoing embodiments and drawings it should be understood that variations and modifications may be made to the foregoing without departing from the scope of the invention. For example, the invention is not limited in its application to a simplified boiling water reactor or a naturally cooled or natural circulation boiling water reactor. The invention may be used with systems other than the gravity-driven cooling suppression pool.

Accordingly, it should be understood that the invention is therefore limited only by the appended claims.

What is claimed is:

1. In a boiling water nuclear reactor of the type having a reactor vessel containing an inventory of saturated water coolant, a reactor core for heating water contained in said reactor vessel to generate a two-phase steam/water mixture, a steam separator assembly for classifying said steam from said water in said two-phase mixture and returning said separated water to said core, and standpipes for conveying said two-phase mixture from said core to said separator, the improvement comprising:

a shroud tank disposed inside said reactor vessel overlying said reactor core, said shroud tank circumscribing said standpipes and having an open top and a closed bottom;

said shroud tank having coolant inlet means communicated to a source of cold coolant for filling said shroud tank with cold coolant during normal operation of said reactor;

said shroud tank having outlet means for providing cold coolant from said shroud tank to cool said reactor core during a loss of coolant accident.

2. The improvement of claim 1 wherein said inlet includes at least one fill pipe.

3. The improvement of claim 1 wherein said outlet means comprises a plurality of holes disposed around the bottom periphery of said shroud tank, said cold coolant draining from said shroud tank into said reactor vessel when the level of said saturated water coolant falls below said holes.

4. The improvement of claim 3 wherein said outlet means is defined in the sides of said tank.

5. The improvement of claim 1 wherein said reactor has a natural circulation cooling system.

6. The improvement of claim 1 wherein said reactor is coupled to a gravity-driven cooling system.

7. The improvement of claim 1 wherein said standpipes are insulated to reduce heat transfer by said two-phase mixture.

8. The improvement of claim 1 and including cold coolant means for injecting at a rate to substantially prevent saturated water from intruding into said shroud tank.

9. The improvement of claim 1 wherein said shroud tank is thermally configured to reduce heat pick up by said cold coolant.

10. The improvement of claim 1 wherein said standpipes exit said reactor core from a core shroud head, said shroud tank bottom resting on and substantially closed by said core shroud head.

11. The improvement of claim 1 further comprising a plurality of other shroud tanks concentrically disposed within said shroud tank.

12. An improved boiling water nuclear reactor comprising;

a reactor vessel containing an inventory of saturated water coolant;

a reactor core in said reactor vessel for heating water to generate a two-phase steam/water mixture;

a steam separator for classifying said steam from said water in said two-phase mixture and for returning said separated water to said core;

standpipes for conveying said two-phase mixture from said core to said separator;

a shroud tank disposed inside said reactor vessel overlying said reactor core and circumscribing said standpipes;

said shroud tank having an open top and a closed bottom;

coolant inlet means communicated from the exterior of said reactor to the interior of said shroud tank;

a source of cold coolant external to said reactor and communicated to said inlet means for filling said shroud tank with cold coolant during normal operation of said reactor; and outlet means adjacent the bottom of said shroud tank for providing cold coolant from said shroud tank to cool said reactor core during a LOCA.

13. In a boiling water nuclear reactor of the type having a reactor vessel containing saturated water coolant, a reactor core contained in said reactor vessel for heating water to create a two-phase steam/water mixture, a steam separator for classifying said steam from said water in said two-phase mixture and returning separated water to said core, and standpipes for conveying said two-phase mixture from said core to said separator, a method for cooling said reactor core comprising the steps of:

provide a shroud tank;

disposing a shroud tank inside said reactor vessel overlying said reactor core and circumscribing said standpipes, said shroud tank having an open top, and a closed bottom;

providing coolant inlet means communicated from the exterior of said reactor to the inside of said shroud tank;

providing a source of cold coolant;

communicating said cold coolant to said coolant inlet means;

filling said shroud tank with cold coolant during normal operation of said reactor; and communicating said coolant from said shroud tank into said reactor vessel to cool said reactor core during a LOCA.

14. The method of claim 13 wherein said step of communicating said cold coolant to cool said core comprises draining said cold coolant from a plurality of holes disposed about the bottom periphery of said shroud tank.

15. The method of claim 13 further comprising the step of insulating said standpipes to reduce heat transfer by said two-phase mixture.

16. The method of claim 13 wherein said feedwater coolant fills said shroud tank at a rate to substantially prevent saturated coolant from intruding into said shroud tank.

17. The method of claim 13 further comprising the step of cooling said reactor core during a LOCA using a gravity-driven cooling system.

18. An improved nuclear power generating system comprising:

a boiling water nuclear reactor for heating feedwater to generate steam;

a turbine-generator for receiving said steam to generate electric power and return condensate;

a feedwater system for communicating said condensate to said boiling water nuclear reactor;

said boiling water nuclear reactor comprising:

a reactor vessel containing an inventory of saturated water coolant;

a reactor core in said reactor vessel for heating water to generate a two-phase steam/water mixture;

a steam separator for classifying said steam from said water in said two-phase mixture and for returning said separated water to said core;

standpipes for conveying said two-phase mixture from said core to said separator;

a shroud tank disposed inside said reactor vessel overlying said reactor core and circumscribing said standpipes;

said shroud tank having an open top and a closed bottom;

coolant inlet means for communicating coolant to the interior of said shroud tank;

a source of cold coolant communicated to said inlet means for filling said shroud tank with cold coolant during normal operation of said reactor; and outlet means adjacent the bottom of said shroud tank for providing cold coolant from said shroud tank to cool said reactor core during a LOCA.

19. The invention of claim 18 wherein said source of cold coolant is communicated to the bottom of said shroud tank.

20. The invention of claim 18 wherein said cold coolant is communicated to said inlet means using said feedwater system.

* * * * *